United States Patent
Ando et al.

(10) Patent No.: US 11,180,126 B2
(45) Date of Patent: Nov. 23, 2021

(54) MASTER CYLINDER DEVICE

(71) Applicant: SUBARU CORPORATION, Tokyo (JP)

(72) Inventors: Yusuke Ando, Tokyo (JP); Naozumi Yoshio, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/062,714

(22) Filed: Oct. 5, 2020

(65) Prior Publication Data
US 2021/0122344 A1     Apr. 29, 2021

(30) Foreign Application Priority Data

Oct. 24, 2019 (JP) .............................. JP2019-193211

(51) Int. Cl.
| | | |
|---|---|---|
| *B60T 11/236* | (2006.01) | |
| *B60T 11/26* | (2006.01) | |
| *B60T 11/224* | (2006.01) | |

(52) U.S. Cl.
CPC ........... *B60T 11/236* (2013.01); *B60T 11/224* (2013.01); *B60T 11/26* (2013.01)

(58) Field of Classification Search
CPC .... B60T 11/236; B60T 11/228; B60T 11/224; B60T 11/26
USPC ........................................................... 60/588
See application file for complete search history.

(56) References Cited

U.S. PATENT DOCUMENTS

| | | | | |
|---|---|---|---|---|
| 2,656,680 | A  * | 10/1953 | Brunner ................... | F16J 15/32 60/588 |
| 6,796,125 | B2 * | 9/2004 | Kusano ................... | B60T 11/20 60/588 |
| 7,040,093 | B2 * | 5/2006 | Legret ................... | B60T 11/232 60/586 |
| 7,055,322 | B2 * | 6/2006 | Yasuda ................. | B60T 11/236 60/588 |
| 7,181,911 | B2 * | 2/2007 | Ishikawa ............... | B60T 11/232 60/588 |
| 7,997,075 | B2 * | 8/2011 | Drott ....................... | B60T 11/16 60/588 |

(Continued)

FOREIGN PATENT DOCUMENTS

| | | | |
|---|---|---|---|
| FR | 2989045 A1 * | 10/2013 | ............ B60T 11/236 |
| JP | 2005-273714 A | 10/2005 | |
| JP | 2017-197052 A | 11/2017 | |

*Primary Examiner* — Thomas E Lazo
(74) *Attorney, Agent, or Firm* — Troutman Pepper Hamilton Sanders LLP

(57) ABSTRACT

A master cylinder device includes a reservoir tank, a master cylinder, a piston, and a pair of cup seals. The master cylinder includes a cylinder body having a cylinder chamber and a master port. The piston is inserted into the cylinder chamber, and has a relief port that communicates with the master port. The cup seals are provided on an inner circumference of the cylinder chamber, being positioned in front and rear of the master port, and seals a space between the inner circumference of the cylinder chamber and an outer circumference of the piston. The relief port is closed by the front cup seal, as the piston moves forward, to generate brake fluid pressure in a brake fluid in a hydraulic chamber. The relief port is tilted from a front side to a rear side, from the outer circumference toward an inner circumference of the piston.

2 Claims, 5 Drawing Sheets

(56) References Cited

U.S. PATENT DOCUMENTS

| | | | |
|---|---|---|---|
| 8,434,304 B2 * | 5/2013 | Hanaoka | B60T 11/236 |
| | | | 60/588 |
| 9,969,373 B2 * | 5/2018 | Konig | B60T 11/232 |
| 10,300,900 B2 * | 5/2019 | Mun | B60T 11/228 |
| 2007/0157613 A1 | 7/2007 | Chiba | |
| 2015/0175142 A1 * | 6/2015 | Lopez-Larequi | B60T 11/28 |
| | | | 60/533 |
| 2015/0360660 A1 * | 12/2015 | Matsumura | F16J 15/16 |
| | | | 92/169.1 |
| 2017/0106844 A1 * | 4/2017 | Mun | F16J 15/16 |

* cited by examiner

MASTER CYLINDER DEVICE

CROSS-REFERENCE TO RELATED APPLICATIONS

The present application claims priority from Japanese Patent Application No. 2019-193211 filed on Oct. 24, 2019, the entire contents of which are hereby incorporated by reference.

BACKGROUND

The technology relates to a master cylinder device having a relief port that is provided in a piston and communicates with a reservoir tank.

As a plunger master cylinder, Japanese Unexamined Patent Application Publication (JP-A) No. 2005-273714 discloses a master cylinder in which a cup seal is fixed to a cylinder and a relief port is provided in a piston. When a driver depresses a brake pedal, the piston slides, causing the relief port to pass by the cup seal. Thus, a pressure chamber is cut off from a path communicating with a reservoir, and brake fluid pressure is generated, causing a brake fluid to be sent under pressure to wheel cylinders.

JP-A No. 2017-197052 discloses an automatic brake device interposed between a master cylinder and wheel cylinders. In response to an instruction from a device such as a side slip prevention device or an automatic emergency brake device, the automatic brake device drives an electric pump to supply brake fluid pressure to the wheel cylinders, thereby activating a brake regardless of a brake operation performed by a driver. Examples of the side slip prevention device include vehicle dynamics control (VDC) and electronic stability control (ESC).

SUMMARY

An aspect of the technology provides a master cylinder device including a reservoir tank, a master cylinder, a piston, and a pair of cup seals. The master cylinder includes a cylinder body. The cylinder body has a cylinder chamber and a master port that is open to an inner circumference of the cylinder chamber and communicates with the reservoir tank. The piston is configured to be inserted into the cylinder chamber to move back and forth in a front-rear direction, and has a relief port that communicates with the master port. The pair of cup seals is provided on the inner circumference of the cylinder chamber, with the cup seals being positioned in front and rear of the master port in an axial direction of the cylinder chamber, and is configured to seal a space between the inner circumference of the cylinder chamber and an outer circumference of the piston. The relief port is configured to be closed by the cup seal provided on a front side in a movement direction of the piston, as the piston moves forward in the cylinder chamber, to generate brake fluid pressure in a brake fluid that is stored in a hydraulic chamber defined by the cylinder chamber and the piston. The relief port is tilted from the front side to a rear side in the movement direction of the piston, from the outer circumference toward an inner circumference of the piston.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
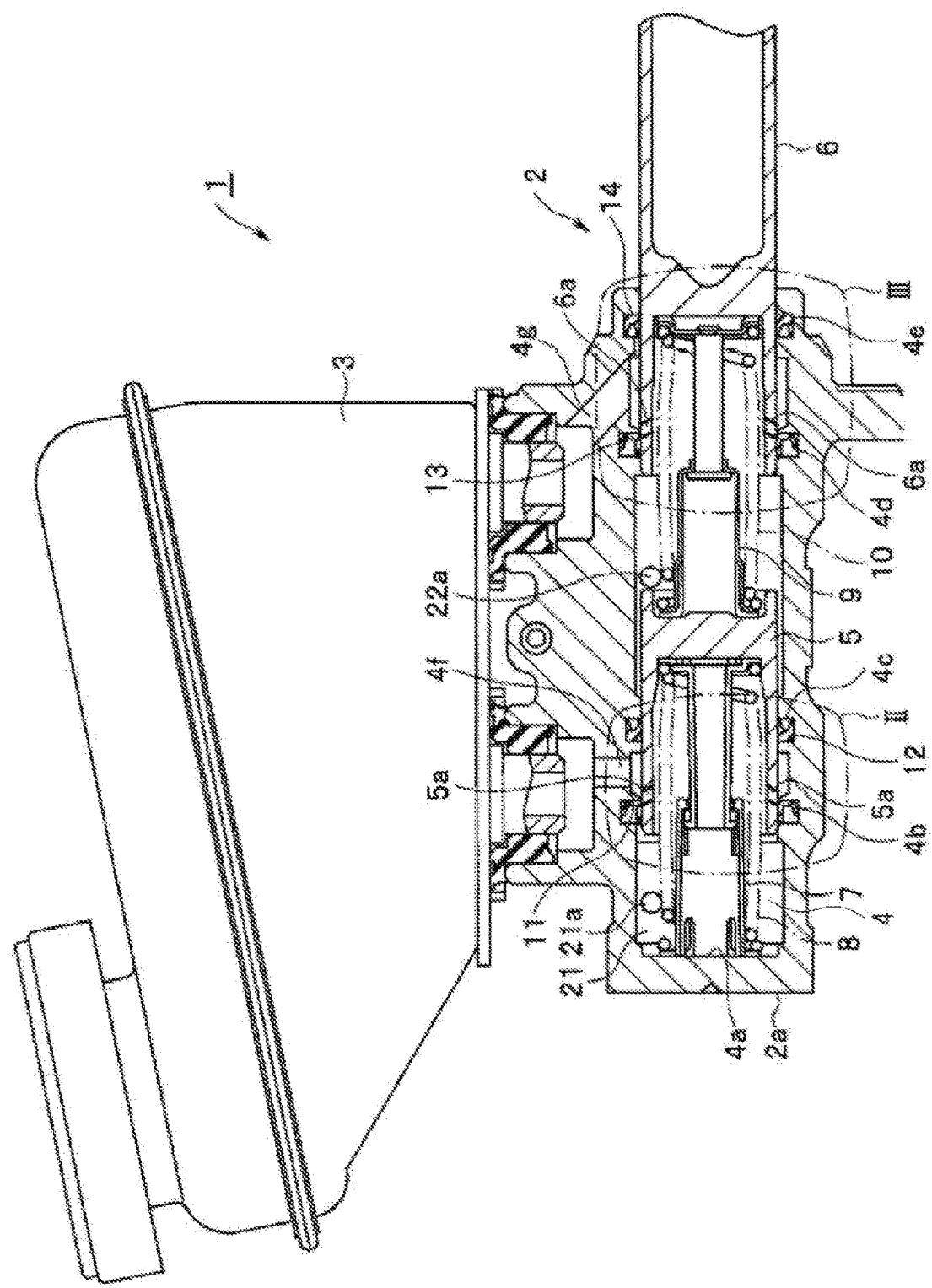
FIG. 1 is a partially cross-sectional side view of a master cylinder device.

As illustrated in FIG. 1, a master cylinder device 1 may include a master cylinder 2 and a reservoir tank 3 that is coupled to the master cylinder 2. The master cylinder 2 may generate brake pressure. In one example, the reservoir tank 3 may be fixedly installed on an upper surface of the master cylinder 2. The reservoir tank 3 may store a brake fluid.

The master cylinder 2 may be a plunger tandem master cylinder including a cylinder body 2a. A cylinder chamber 4 of the cylinder body 2a may have an opening at one end. A secondary piston 5 and a primary piston 6 may be inserted into the cylinder chamber 4 via the opening. A secondary support shaft 7 extendable in its axial direction may be interposed between the secondary piston 5 and a front end of the cylinder chamber 4. A secondary return spring 8 may be interposed between retainers provided at both ends of the secondary support shaft 7.

A primary support shaft 9 extendable in its axial direction may be interposed between the primary piston 6 and the secondary piston 5. A primary return spring 10 may be interposed between retainers provided at both ends of the primary support shaft 9. Although not illustrated, a push rod may be inserted into the primary piston 6 from a rear end, protruding from the cylinder body 2a, of the primary piston 6. The push rod may be coupled, via a servo mechanism, to a brake pedal to be depressed by a driver.

In a state in which the pistons 5 and 6 are inserted into the cylinder chamber 4, the secondary piston 5 and a front wall 4a of the cylinder chamber 4 may be separated from each other by a predetermined distance, under urging force of the secondary return spring 8. The secondary piston 5 and the primary piston 6 may be separated from each other by a predetermined distance, under urging force of the primary return spring 10.

On the secondary piston 5 side of an inner circumference of the cylinder chamber 4, a pair of first and second secondary cup grooves 4b and 4c may be provided with a predetermined interval therebetween. On the primary piston 6 side of the inner circumference of the cylinder chamber 4, a pair of first and second primary cup grooves 4d and 4e may be provided with a predetermined interval therebetween.

A secondary pressure (S.P) cup 11 may be installed in the first secondary cup groove 4b, and a pressure (Pr) cup 12 may be installed in the second secondary cup groove 4c. The cups 11 and 12 may each have a cup-shaped cross-section and include an inner circumference (inner side surface), an outer circumference (outer side surface), and a cup bottom joining the inner circumference and the outer circumference. The cup bottom may configure the back of the cup, and may also be referred to as a rear part for the secondary pressure cup 11. The cups 11 and 12 may be provided in a state in which the respective cup bottoms are opposite to each other. A primary pressure (P.P) cup 13 may be installed in the first primary cup groove 4d, and a primary supply (P.S) cup 14 may be installed in the second primary cup groove 4e. The cups 13 and 14 may each have a cup-shaped cross-section. Each of the cups 13 and 14 may be provided in a state in which its opening faces forward and its cup bottom is positioned in the rear. The cup bottom may also be referred to as a rear part for the primary pressure cup 13. In one embodiment, the cups 11 to 14 may serve as a "cup seal".

The cylinder body 2a may have a secondary master port 4f and a primary master port 4g. The secondary master port 4f may be provided in the cylinder chamber 4 between the S.P cup 11 and the Pr cup 12. The primary master port 4g may be provided in the cylinder chamber 4 between the P.P cup 13 and the P.S cup 14. In one embodiment, the master ports 4f and 4g may serve as a "master port". The master ports 4f and 4g may communicate with the reservoir tank 3. In some embodiments, a "port" may also be referred to as a "through hole".

A space between an outer circumference of the secondary piston 5 and the inner circumference of the cylinder chamber 4 may be sealed by the cups 11 and 12. A space between an outer circumference of the primary piston 6 and the inner circumference of the cylinder chamber 4 may be sealed by the cups 13 and 14. FIG. 1 illustrates the master cylinder 2 in a brake released state in which the brake pedal is undepressed.

Figure 2:
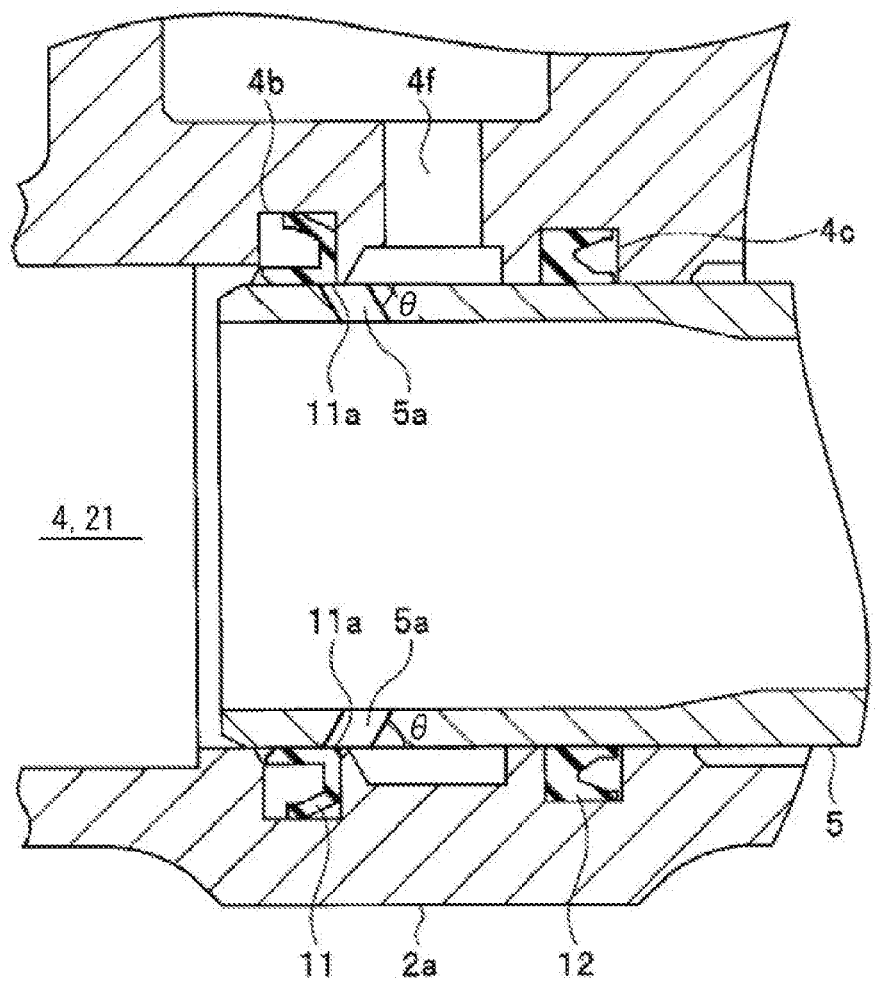
FIG. 2 is an enlarged cross-sectional partial view of a secondary piston of a master cylinder.
Figure 3:
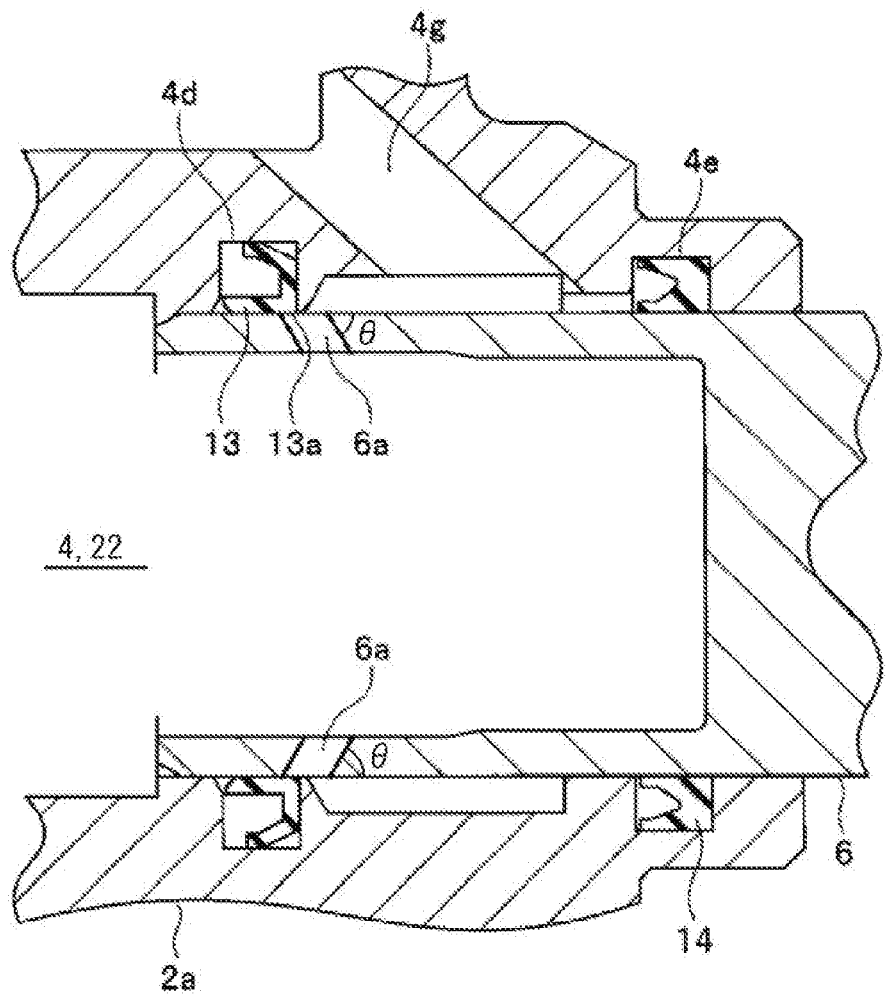
FIG. 3 is an enlarged cross-sectional partial view of a primary piston of the master cylinder.

In this state, a secondary relief port 5a provided in the secondary piston 5 may be open toward the rear part of the S.P cup 11, as illustrated in FIG. 2. A primary relief port 6a provided in the primary piston 6 may be open toward the rear part of the P.P cup 13, as illustrated in FIG. 3. FIG. 2 illustrates a portion indicated by "II" in FIG. 1, and FIG. 3 illustrates a portion indicated by "III" in FIG. 1.

In the cylinder chamber 4, a space between the secondary piston 5 and the front wall 4a may be sealed by the S.P cup 11 to configure a secondary hydraulic chamber 21. Moreover, a space between the secondary piston 5 and the primary piston 6 may be sealed by the cups 12 and 13 to configure a primary hydraulic chamber 22, as illustrated in FIG. 3. Consequently, in the state in which the brake pedal is undepressed as illustrated in FIG. 1, the hydraulic chamber 21 may communicate with the reservoir tank 3 via the relief port 5a and the master port 4f, and the hydraulic chamber 22 may communicate with the reservoir tank 3 via the relief port 6a and the master port 4g.

A secondary inlet and outlet port 21a may be provided on the inner circumference of the cylinder chamber 4 on the secondary hydraulic chamber 21 side. A primary inlet and outlet port 22a may be provided on the inner circumference of the cylinder chamber 4 on the primary hydraulic chamber 22 side. The inlet and outlet ports 21a and 22a may communicate with a brake fluid pressure circuit of a known automatic brake device. In some embodiments, the inlet and outlet ports 21a and 22a may communicate with a brake fluid pressure circuit of an automatic brake device disclosed in JP-A No. 2017-197052. The brake fluid pressure circuit may communicate with the wheel cylinder of a brake caliper provided for each wheel.

A positional relationship of the secondary relief port 5a with respect to the S.P cup 11 in the axial direction may be the same as a positional relationship of the primary relief port 6a with respect to the P.P cup 13 in the axial direction. Consequently, when the driver depresses the brake pedal, the pistons 5 and 6 may slide, causing the relief ports 5a and 6a to be closed at the same time by the S.P cup 11 and the P.P cup 13, respectively. This raises brake fluid pressure in the secondary hydraulic chamber 21 and the primary hydraulic chamber 22, causing the brake fluid to be discharged from the inlet and outlet ports 21a and 22a. When the driver releases force applied to the brake pedal, the pistons 5 and 6 may be returned to their initial positions under the urging force of the return springs 8 and 10, respectively, causing the relief ports 5a and 6a to be opened at the same time.

As illustrated in FIG. 2, the relief port 5a may be tilted from a front side toward a rear side (base end side) in a movement direction of the piston 5, from the outer circumference toward an inner circumference of the piston 5. As illustrated in FIG. 3, the relief port 6a may be tilted from a front side toward a rear side (base end side) in a movement direction of the piston 6, from the outer circumference toward an inner circumference of the piston 6. Each of the relief ports 5a and 6a may be tilted at a predetermined angle θ with respect to an axial direction of the cylinder chamber 4. In the example embodiment, the axial direction of the cylinder chamber 4 may be parallel to axial directions of the cylinder body 2a and the pistons 5 and 6. The predetermined (tilt) angle θ may be an angle, other than a right angle, provided from the front side toward the rear side in the movement direction of each of the pistons 5 and 6, from the outer circumference toward the inner circumference of each of the pistons 5 and 6. The predetermined angle θ may be set as appropriate for each type of a vehicle to be equipped with the master cylinder device 1 and the automatic brake device.

Furthermore, a part 11a of the inner circumference at the back (i.e., the rear part) of the cup 11 may be exposed to the relief port 5a in an open state. A part 13a of the inner circumference at the back (i.e., the rear part) of the cup 13 may be exposed to the relief port 6a in an open state. Hereinafter, these parts 11a and 13a may be referred to as exposed parts 11a and 13a for convenience.

Now, description will be given on operation of the master cylinder device 1 based on such a configuration. Assume a case where the vehicle equipped with the master cylinder device 1 and the automatic brake device is traveling. When the automatic brake device is activated and the electric pump supplies the brake fluid to the wheel cylinder of the brake caliper provided for each wheel, the wheel cylinder may operate the brake caliper to generate brake force for each wheel, thereby decelerating the vehicle.

When the automatic brake device supplies the brake fluid to the wheel cylinder, negative pressure may be generated upstream, e.g., on the reservoir tank 3 side. The brake fluid stored in the reservoir tank 3 may thus be sucked toward the primary master port 4g and the secondary master port 4f provided in the cylinder body 2a of the master cylinder 2.

The brake fluid sucked toward the primary master port 4g may flow into the cylinder chamber 4 on the outer circumference of the primary piston 6, which is sealed by the P.P cup 13 and the P.S cup 14. The brake fluid sucked toward the secondary master port 4f may flow into the cylinder chamber 4 on the outer circumference of the secondary piston 5, which is sealed by the S.P cup 11 and the Pr cup 12.

The brake fluid that has flowed into the cylinder chamber 4 on the outer circumference of the primary piston 6 may pass through the primary relief port 6a provided in the primary piston 6, to be sucked into the primary hydraulic chamber 22. The brake fluid may thereafter flow to the brake fluid pressure circuit of the automatic brake device via the primary inlet and outlet port 22a. The brake fluid that has flowed into the cylinder chamber 4 on the outer circumference of the secondary piston 5 may pass through the secondary relief port 5a provided in the secondary piston 5, to be sucked into the secondary hydraulic chamber 21. The brake fluid may thereafter flow to the brake fluid pressure circuit of the automatic brake device via the secondary inlet and outlet port 21a.

Figure 5:
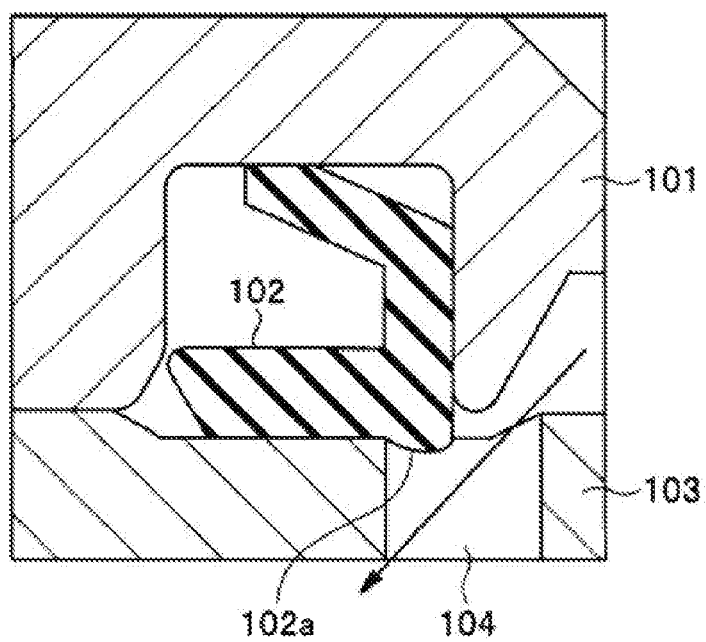
FIG. 5 is an enlarged cross-sectional partial view of a cylinder body, a piston, and a pressure cup in an existing technique.

Assume a case where, as illustrated in FIG. 5, a relief port 104 provided in a piston 103 is not tilted, being perpendicular to an axial direction of a cylinder chamber. In this case, when the brake fluid flows through the relief port 104, the brake fluid generates negative pressure in the relief port 104. This causes an exposed part 102a on an inner circumference of a cup seal 102 to be pulled to bulge toward the relief port 104. The cup seal 102 is attached to a cylinder 101.

Suction caused by the automatic brake device being activated by an instruction from the side slip prevention device does not cause the exposed part 102a of the cup seal 102 to greatly bulge toward the relief port 104. However, when causing the own vehicle to suddenly stop, as with automatic emergency braking, the automatic brake device supplies the brake fluid under raised pressure to the wheel cylinder. This increases a flow velocity of the brake fluid stored in a reservoir tank, and accordingly increases the negative pressure in the relief port 104.

Figure 6:
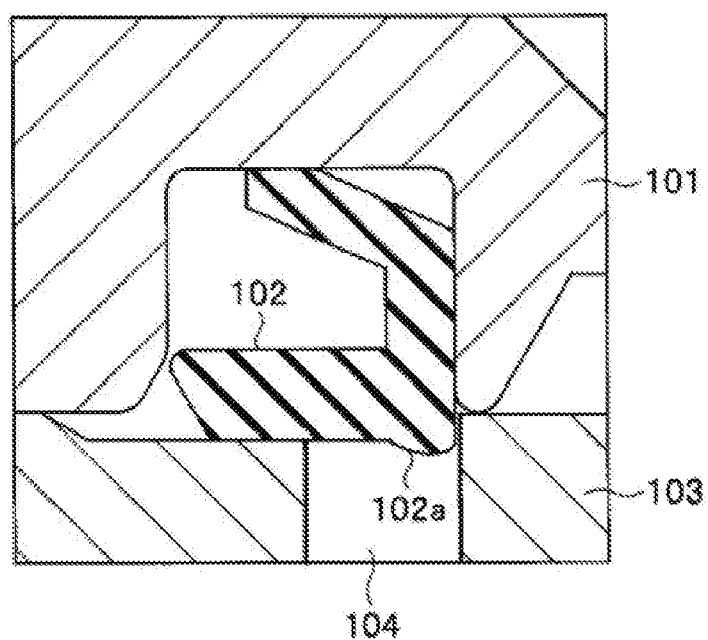
FIG. 6 is an enlarged cross-sectional partial view of a state in which the piston illustrated in FIG. 5 has been caused to slide.

As a result, the exposed part 102a of the cup seal 102 greatly bulges toward the relief port 104. In that case, when the driver strongly depresses the brake pedal to cause the piston 103 to slide forward, passage of the piston 103 is likely to cause shearing of the exposed part 102a of the cup seal 102 that has entered the relief port 104, as illustrated in FIG. 6. This results in a decrease in durability of the cup seal 102.

A measure against the above concern may be to increase hardness of the cup seal 102. However, this makes it difficult to guarantee long-term airtightness, and shortens a maintenance cycle. Another measure may be to restrict raised-pressure output of the brake fluid by the automatic brake device to suppress an amount of bulging, toward the relief port 104, of the exposed part 102a of the cup seal 102. However, this results in a decrease in brake performance upon activation of the automatic brake device based on automatic emergency braking. Another measure may be to restrict pressure of a brake booster upon activation of the automatic brake device to restrict a brake operation to be performed by the driver. However, this changes a feel of depressing the brake pedal, causing the driver to feel anxiety.

In contrast, in the example embodiment, the primary relief port 6a provided in the primary piston 6 may be tilted at the predetermined angle $\theta$ with respect to a front-rear direction, from the outer circumference toward the inner circumference, as illustrated in FIG. 3. Similarly, the secondary relief port 5a provided in the secondary piston 5 may also be tilted in the same direction at the same angle $\theta$ as that of the primary relief port 6a, as illustrated in FIG. 2.

Figure 4:
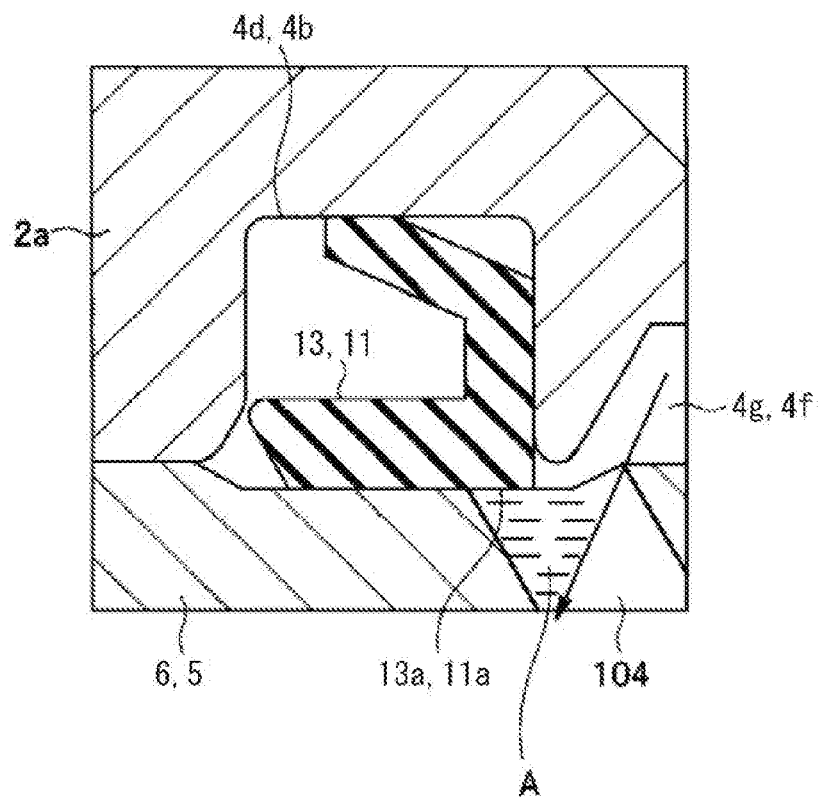
FIG. 4 is an enlarged cross-sectional partial view of a cylinder body, a piston, and a pressure cup.

Consequently, as indicated by an arrow in FIG. 4, the brake fluid that passes through the relief port 5a may partially be sucked from the cylinder chamber 4 side to collide with a wall of the relief port 5a on the S.P cup 11 side, and thereafter flow out to the master port 4f. Moreover, the brake fluid that passes through the relief port 6a may partially be sucked from the cylinder chamber 4 side to collide with a wall of the relief port 6a on the P.P cup 13 side, and thereafter flow out to the master port 4g.

When the brake fluid collides with the wall of the relief port 5a, the brake fluid may partially splash up to the S.P cup 11. This generates a fluid accumulation A between the exposed part 11a of the S.P cup 11 and the brake fluid colliding with the wall. When the brake fluid collides with the wall of the relief port 6a, the brake fluid may partially splash up to the P.P cup 13. This generates the fluid accumulation A between the exposed part 13a of the P.P cup 13 and the brake fluid colliding with the wall. This causes the generated fluid accumulation A to suppress generation of negative pressure near each of the exposed parts 11a and 13a of the S.P cup 11 and the P.P cup 13.

Consequently, for example, in a case where the automatic brake device applies sudden braking at high brake fluid pressure in response to an instruction from an automatic emergency brake device, high negative pressure is not generated near the exposed parts 11a and 13a even if the brake fluid passes through the relief ports 5a and 6a at a high flow velocity. This makes it is possible to suppress bulging of the exposed part 11a toward the relief port 5a and bulging of the exposed part 13a toward the relief port 6a.

Therefore, when the automatic brake device is activated, even if the driver strongly depresses the brake pedal to cause the secondary piston 5 and the primary piston 6 of the master cylinder 2 to slide, passage of the secondary piston 5 and the primary piston 6 of the master cylinder 2 does not cause the exposed parts 11a and 13a to shear. This makes it possible to keep durability of the S.P cup 11 and the P.P cup 13.

In the example embodiment as described above, the relief port provided in the piston is tilted from the front side to the rear side in the movement direction of the piston, from the outer circumference toward the inner circumference of the piston. Thus, when the brake fluid stored in the reservoir tank is sucked into the hydraulic chamber via the relief port, the brake fluid may collide with an inner wall of the relief port to generate, as the piston moves, the fluid accumulation near the cup seal provided on the front side in the movement direction. This makes it less likely for the inner circumference of the cup seal to bulge toward the relief port under negative pressure, making it possible to suppress shearing of the inner circumference of the cup seal due to the back-and-forth movement of the piston. This helps to suppress a decrease in durability of the cup seal, shortening of the maintenance cycle, and a decrease in the brake performance, and prevent the feel of depressing the brake pedal from changing, making it possible to suppress the feeling of anxiety of the driver.

In one example, the secondary relief port 5a provided in the secondary piston 5 and the primary relief port 6a provided in the primary piston 6 may be tilted from the front side toward the rear side in the movement direction, from the outer circumference toward the inner circumference. In other words, the secondary relief port 5a and the primary relief port 6a may be tilted in a direction of departing from the S.P cup 11 and the P.P cup 13, respectively, from the outer circumference toward the inner circumference. Thus, when the automatic brake device, for example, is activated and the brake fluid stored in the reservoir tank 3 passes through the secondary relief port 5a and the primary relief port 6a to be sucked into the hydraulic chamber 21 and the hydraulic chamber 22, respectively, it is possible to cause the brake fluid to collide with the walls of the relief ports 5a and 6a.

As a result, it is possible to generate the fluid accumulation A near each of the exposed parts 11a and 13a of the S.P cup 11 and the P.P cup 13, which makes it possible to suppress generation of negative pressure in these parts, and suppress bulging of the exposed part 11a toward the relief port 5a and bulging of the exposed part 13a toward the relief port 6a. Consequently, even if the pistons 5 and 6 move forward, the movement does not cause the exposed parts 11a and 13a to shear, which makes it possible to improve the durability of the cups 11 and 13.

Improving the durability of the cups 11 and 13 makes it possible to lengthen the maintenance cycle, which helps to reduce economic burdens on the driver. The improvement in the durability also makes it unnecessary to restrict the raised-pressure output of the brake fluid by the automatic brake device, which prevents a decrease in the brake performance. Furthermore, the improvement in the durability makes it unnecessary to restrict pressure of the brake booster upon activation of the automatic brake device. This prevents the feel of depressing the brake pedal from changing, preventing the driver from feeling anxiety.

The technology is not limited to the example embodiment described above. For example, a structure in which the relief ports 5a and 6a are tilted at the predetermined (tilt) angle θ may also be applied to a normal brake system not equipped with an automatic brake device and in which the master cylinder device 1 directly communicates with a wheel cylinder of a brake caliper.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A master cylinder device comprising:
a reservoir tank;
a master cylinder including a cylinder body, the cylinder body having a cylinder chamber and a master port that is open to an inner circumference of the cylinder chamber and communicates with the reservoir tank;
a piston configured to be inserted into the cylinder chamber to move back and forth in a front-rear direction, and having a relief port that communicates with the master port; and
a pair of cup seals provided on the inner circumference of the cylinder chamber, the pair of cup seals comprising a first cup seal disposed on the front of the master port and a second cup seal, the pair of cup seals being positioned in an axial direction of the cylinder chamber and configured to seal a space between the inner circumference of the cylinder chamber and an outer circumference of the piston,
wherein the first cup seal comprises an exposed part on an inner circumference of the first cup seal, the exposed part being at least partially exposed to the relief port when a brake pedal is undepressed;
wherein the relief port is configured to be closed by the cup seal provided on a front side in a movement direction of the piston, as the piston moves forward in the cylinder chamber, to generate brake fluid pressure in a brake fluid that is stored in a hydraulic chamber defined by the cylinder chamber and the piston,
wherein the relief port is tilted from the front side to a rear side in the movement direction of the piston, from the outer circumference toward an inner circumference of the piston; and
wherein the relief port is configured to (1) communicate with the master port when the brake pedal is undepressed, (2) collide with the brake fluid that flows into the relief port from the master port at a front-side wall of the relief port, and (3) cause at least a portion of the brake fluid that flows into the relief port from the master port to be directed toward the exposed part when the brake pedal is undepressed.

2. The master cylinder device according to claim 1, wherein the piston inserted into the cylinder body comprises a primary piston and a secondary piston coupled to the primary piston, and the relief port provided in each of the primary piston and the secondary piston is tilted from a front end side to a base end side of the piston, from the outer circumference toward the inner circumference of the piston.

* * * * *